Figure 1:
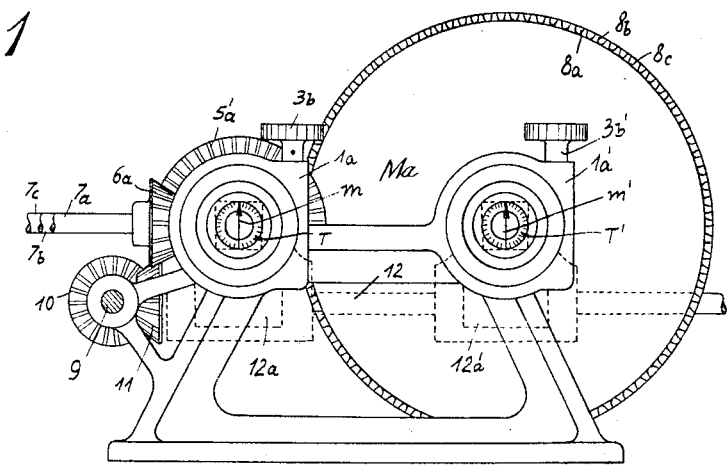

Jan. 9, 1934.　　K. PETSCHENIG　　1,943,229
APPARATUS FOR MECHANICALLY DETERMINING THE ALGEBRAIC SUM OF ANGLES
OF ROTATION AND OF ANGULAR SPEEDS OF SHAFTS AND FOR
TRANSMITTING SUCH SUMS TO OTHER APPARATUS
Filed May 20, 1932

Inventor:
K. Petschenig.
By E. F. Wenderoth
Atty

Patented Jan. 9, 1934

1,943,229

UNITED STATES PATENT OFFICE 1,943,229

APPARATUS FOR MECHANICALLY DETERMINING THE ALGEBRAIC SUM OF ANGLES OF ROTATION AND OF ANGULAR SPEEDS OF SHAFTS AND FOR TRANSMITTING SUCH SUMS TO OTHER APPARATUS

Karl Petschenig, Vienna, Austria, assignor to the firm Actiengesellschaft C. P. Goerz Optische Anstalt Actiova Spolecnost K. P. Goerz Opticky Ustav, Bratislava, Czechoslovakia, a company of Czechoslovakia Application May 20, 1932, Serial No. 612,578, and in Germany May 29, 1931

5 Claims. (Cl. 88—2.7)

My invention relates to an apparatus for mechanically determining the algebraic sum of angles of rotation and of angular speeds of shafts. In the case of angular speeds the algebraic sum of the angular speeds so determined may be transmitted to a further shaft while in the case of angles of rotation the algebraic sum so determined may be either read or transmitted to another apparatus.

An apparatus of this kind may be used for instance as a commanding apparatus for artillery purposes and more particularly for anti-aircraft ordnance, but it may also be found useful for many other more or less similar cases. Heretofore it has been proposed to solve the problem in question by means of differential gears in the case of two shafts or by combinations of differential gears in the case of more than two shafts. Such constructions are very complicated and consequently expensive, but they also lack the exactness required in many cases owing to the unavoidable lost motion between the teeth of engaging toothed wheels and the long series of toothed wheels engaging into each other.

The main object of my invention is to provide an apparatus of this class simple and cheap in construction and exact and reliable in operation. Other objects of my present invention may be seen from the following description of my present apparatus. According to my present invention the shafts, the angles of rotation or angular speeds of which have to be added to each other algebraically are each associated to an optical reversing prism, the said prisms being arranged coaxially and in series. If now a pointer mark kept stationary is observed through one of such reversing prisms and this prism is turned around its optical axis through a given angle the image of the said "pointer mark" is apparently turned around the said optical axis through twice the said angle. Consequently if each of the reversing prisms of the series is turned through a given angle around its optical axis, the optical axes of all the prisms being in alignment, the image of a pointer mark kept stationary and observed through the series of reversing prisms will apparently be turned through an angle representing the double algebraic sum of the angles through which each of the said reversing prisms has been turned individually around the optical axis common to all of the said reversing prisms. The angle through which the image of the pointer mark has been apparently turned may then be read on an angle scale or it may be transmitted mechanically to another apparatus by means of a transmitting shaft. In this latter case the pointer mark is rotatably mounted and may be thrown into engagement with the said transmitting shaft. Assuming for a moment that the pointer mark is kept stationary its image will be apparently turned as above explained. If, however, the said transmitting shaft and thereby also the pointer mark is so turned by hand that the image of the pointer mark apparently remains stationary in a predetermined or zero position then the pointer mark has been turned bodily through an angle representing the double algebraic sum of the angles through which the aforesaid reversing prisms have been turned individually and the said transmitting shaft has been turned through a corresponding angle.

Since the image of the pointer mark apparently rotates in the field of vision twice as rapidly as the individual reversing prisms are rotated, it returns to its initial position, whenever the algebraic sum of the rotations of the individual reversing prisms is 180°, therefore in all cases in which the said algebraic sum might exceed 180°, means must be provided for counting the half revolutions of the image of the pointer mark. These means comprise a set of counting reversing prisms one associated to each of the measuring reversing prisms and so geared with its associated measuring prism that for each half revolution of the measuring prism the associated counting prism is turned through the $n$-th part of 180° if the maximum algebraic sum of the angles of rotation of all the measuring prisms does not exceed $n$ times 360°. That is to say the leverage between each measuring prism and the counting prism associated thereto is $n$ to 1. The same as the measuring prisms the counting prisms are arranged optically coaxially and in series so that a pointer mark in their field of vision is apparently turned through a correspondingly reduced angle which, when read on an angle scale, gives the algebraic sum of half revolutions of the measuring prisms. For transmitting the total sum of angles by the aforesaid transmitting shaft to another apparatus after the measuring prisms have completed their rotations also the pointer mark of the counting prisms has to be rotatably mounted and has to be turned back by the transmitting shaft through the medium of a suitable gearing having the proper leverage until it reaches a predetermined or zero position simultaneously with the pointer mark of the measuring prisms.

The annexed drawing illustrates by way of example an embodiment of my invention for the algebraic addition of three angles of rotation or three angular speeds of three shafts.

Figure 2:
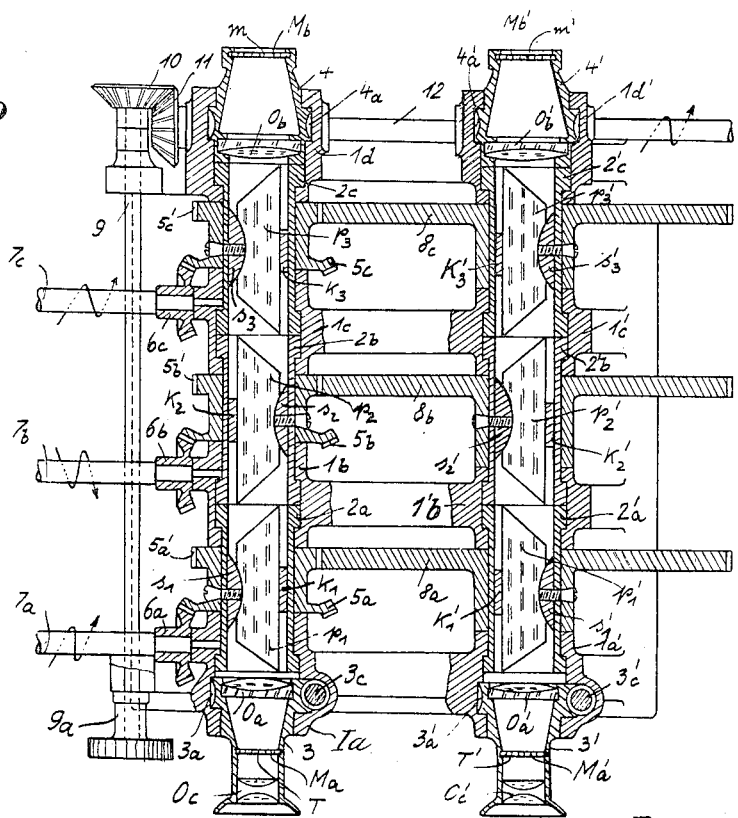

Fig. 1 is a front elevation and Fig. 2 is a plan view partly in section of this embodiment.

$1a$, $1b$, $1c$, $1d$ are four bearings arranged in alignment and $1'a$, $1'b$, $1'c$ and $1'd$ are four other bearings also arranged in alignment, the axes of $1a$, $1b$, $1c$, $1d$ being parallel to the axis of the bearings $1'a$, $1'b$, $1'c$, $1'd$. In each series of bearings there are rotatably mounted three tubular prism casings $2a$, $2b$, $2c$ and $2'a$, $2'b$, $2'c$ respectively which prism casings are locked against longitudinal movement. In each of these tubular prism casings is secured a Dove reversing prism $p_1$, $p_2$ $p_3$ and $p'_1$ $p'_2$ $p'_3$ respectively between a segment $s_1$ $s_2$ $s_3$ and $s'_1$ $s'_2$ $s'_3$ and a clock $k_1$ $k_2$ $k_3$ and $k'_1$ $k'_2$ $k'_3$ respectively. On each of the tubular casings $2a$, $2b$, $2c$ of one, the left hand series is fast a pair of gear wheels. One gear wheel of each pair, the mitre wheel, $5a$, $5b$, $5c$ meshes with a mitre wheel $6a$, $6b$, $6c$ respectively of half of the pitch circle radius of its associated mitre wheel $5a$, $5b$, $5c$ respectively. The mitre wheels $6a$, $6b$, $6c$ are each mounted on a measuring shaft $7a$, $7b$, $7c$ of which the angles of rotation or the angular speeds have to be algebraically added to each other. It will be understood that owing to the simple reversion of the sides of the images by the prisms as will be more fully set forth on describing the operation of the apparatus, the directions of rotation of successive shafts $7a$, $7b$, $7c$ must alternate as is indicated in Fig. 2 by arrows. Adjacent to one of the extreme prism casings and co-axial thereto is arranged a telescope 3 comprising the objective $O_a$, a pointer mark $M_a$ located in the focal plane of the objective and an eye piece $O_c$. The telescope 3 is provided with a worm wheel $3a$, engaging with a worm $3c$ rotatably mounted in the body of the bearing $1a$ but locked against longitudinal movement. $3b$ is the handle disc of the worm. Adjacent to the other extreme prism casing a collimator 4 is rotatably mounted on the bearing $1d$, but locked against longitudinal movement. This collimator 4 comprises an objective $O_b$ and a bone glass disc $M_b$ carrying a pointer mark $m$ passing through the optical axis.

In Figure 1 the pointer marks $m$ and $M_a$ are shown as coinciding with each other.

The collimator tube too carries a worm wheel $4a$ into which engages at $12a$ a worm, not shown, on the transverse shaft 12. Similarly at one end of the right hand series of tubular prism casings $2'a$ $2'b$ $2'c$ a telescope $3'$ is rotatably mounted which is similar to the telescope 3 of the left hand series and comprises an objective $O'_a$, a pointer mark disc $M'_a$ and an eye piece $O'_c$ rotatably by a worm gearing $3'a$ $3'b$ $3'c$. At the other end of the right hand series of tubular prism casings is rotatably mounted a collimator $4'$ similar to the collimator 4 of the right hand series and comprising an objective $O'_b$ and a pointer mark disc $M'_b$ and rotatable by a worm gearing $4'a$, $12'a$ from the transverse shaft 12. The leverage of this worm gearing $4'a$, $12'a$ is $n$ times that of the worm gearing $4a$, $12a$ of the left hand series of tubular prism casings if the maximum sum of rotations of the measuring shafts $7a$, $7b$, $7c$ is $n$ times $360°$. Thus, if for instance the leverage of the worm gearing $4a$, $12a$ were 4:20 and the maximum sum of angles of rotation of the shafts $7a$, $7b$, $7c$ did not exceed $1440° = 4 \times 360°$ the leverage of the worm gearing would have to be 1:20. In the same ratio 4:1 the reversing prisms of the right hand series must be rotated as compared with the corresponding reversing prisms of the left hand series. For this purpose spur wheels $8a$, $8b$, $8c$ are fast on the tubular prism casings $2'a$ $2'b$ $2'c$ and engage into correspondingly smaller spur pinions $5'a$, $5'b$, $5'c$ on the tubular prism casings of the left hand series.

The transverse shaft 12 is operated by a shaft 9 carrying a handle disc $9a$ through the medium of two mitre wheels 10 and 11 meshing with each other. The operation of the apparatus hereinbefore described is as follows:

If each of the three measuring shafts $7a$ $7b$ $7c$ is turned individually through any given angle in the one or in the other direction, the positive direction being indicated by some suitable means, say arrows, then the prism casing associated to each of the said shafts will be turned through half the angle of rotation of its associated shaft $7a$ $7b$ $7c$ owing to the mitre gears $6a$ $5a$, $6b$ $5b$, $6c$ $5c$ interposed therebetween. But as by so turning any of the reversing measuring prisms $p_1$ $p_2$ $p_3$ through any angle the image of the pointer mark $m$ on the pointer mark disc $M_b$ is apparently turned through twice this angle, therefore each of the prisms $p_1$ $p_2$ $p_3$ causes the said image to be turned through the angle of rotation of the measuring shaft $7a$ $7b$ $7c$ associated to such prism. Now as each individual prism acts like a simple mirror, therefore the apparent rotation of the image, brought about by turning the prism $p_3$, would be counteracted by a rotation of the next following prism $p_2$ in the same direction, and so on. Consequently for apparently turning the image of the pointer mark $m$ by the rotation of the prism $p_2$ in the same direction as by the rotation of the prism $p_3$ the shaft $7b$ associated to the prism $p_2$ must be rotated in a direction opposite to that of the shaft $7c$ of the prism $p_3$ whenever the angle of rotation of the shaft $7b$ has to be added to the angle of rotation of the shaft $7c$ and the image of the pointer mark $m$ has to be turned through an angle equal to the sum of the angles of rotation of the shafts $7c$ and $7b$ as is shown in Fig. 2 by the arrows indicating the direction of rotation of the shafts $7c$ and $7b$, the same applies to any pair of successive measuring shafts. After the various measuring shafts have been adjusted the algebraic sum of their angles of rotation may be read on an angle scale on the plate $M_a$. If it is desired to determine and read further algebraic sum of angles of rotation of the shafts $7a$, $7b$, $7c$ without returning the latter to their initial positions, the telescope 3 may be turned by the worm gear $3a$ $3b$ $3c$ so far that the zero point of the angle scale on the plate $M_a$ coincides with the apparent position of the pointer mark $m$ as last found.

If it is desired to transmit the algebraic sum of the angles of rotation of the various shafts $7a$ $7b$ $7c$ to another apparatus by the transverse shaft 12 which then acts as the transmitting shaft, the shaft 12 is turned by hand so far that the pointer marks of the pointer mark plates $M_b$, $M'_b$ actuated thereby are returned to their initial or zero position. If, however, the algebraic sum of the angular speeds of the measuring shafts $7_a$ $7_b$ $7_c$ has to be transmitted to another apparatus by means of the transmitting shaft 12 this latter shaft has to be so turned by hand that the apparent rotary movement of the image of the pointer mark $m$ is exactly compensated for by the rotation of the pointer mark plate due to the rotation of the measuring prisms $p_1$ $p_2$ $p_3$, the said image thus appearing stationary. In this case the right hand or counting series of prisms may be dispensed with.

What I claim is:

1. An apparatus of the class hereinbefore described comprising the combination of a plurality of reversing prisms arranged coaxially and in series with a pointer mark at one end of the said series, means including an angle scale provided at the opposite end of the series for observing the said pointer mark through the series of reversing prisms, and means comprising measuring shafts for rotating each of the said reversing prisms individually and independently of each other around their common axis whereby the apparent angle of rotation of the image of the said pointer mark on the said angle scale is made equal to the algebraic sum of the angles of rotation of the said measuring shafts.

2. An apparatus of the class hereinbefore described comprising the combination of a plurality of reversing prisms arranged coaxially and in series with a pointer mark at one end of the said series, means including an angle scale provided at the opposite end of the series for observing the said pointer mark through the series of reversing prisms, and means comprising measuring shafts for rotating each of the said reversing prisms individually and independently of each other around their common axis whereby the apparent angle of rotation of the image of the said pointer mark on the said angle scale is made equal to the algebraic sum of the angles of rotation of the said measuring shafts and means for rotating the said angle scale around the common axis of the said reversing prisms and for holding it in any position.

3. An apparatus of the class hereinbefore described comprising the combination of a plurality of reversing prisms arranged coaxially and in series with a pointer mark at one end of the said series, means including an angle scale provided at the opposite end of the series for observing the said pointer mark through the series of reversing prisms and means comprising measuring shafts for rotating each of the said reversing prisms individually and independently of each other around their common axis whereby the apparent angle of rotation of the image of the said pointer mark on the said angle scale is made equal to the algebraic sum of the angles of rotation of the said measuring shafts, and means comprising a transmitting shaft for turning the said pointer mark around the common axis of the said reversing prisms whereby the image of the said pointer mark may be returned to a predetermined position.

4. An apparatus of the class hereinbefore described comprising the combination of a plurality of reversing prisms arranged coaxially and in series with a pointer mark at one end of the said series, means including an angle scale provided at the opposite end of the series for observing the said pointer mark through the series of reversing prisms, and means comprising measuring shafts for rotating each of the said reversing prisms individually and independently of each other around their common axis whereby the apparent angle of rotation of the image of the said pointer mark on the said angle scale is made equal to the algebraic sum of the angles of rotation of the said measuring shafts and a second set of reversing prisms arranged coaxially and in series, each of the last named reversing prisms being associated to one of the first named reversing prisms and a gearing interposed between any two associated reversing prisms whereby the rotation of any of the first named reversing prisms through any angle brings about a rotation of the reversing prism associated thereto through a predetermined fraction of the said angle.

5. An apparatus of the class hereinbefore described comprising the combination of a plurality of reversing prisms arranged coaxially and in series with a pointer mark at one end of the said series, means including an angle scale provided at the opposite end of the series for observing the said pointer mark through the series of reversing prisms, and means comprising measuring shafts for rotating each of the said reversing prisms individually and independently of each other around their common axis whereby the apparent angle of rotation of the image of the said pointer mark on the said angle scale is made equal to the algebraic sum of the angles of rotation of the said measuring shafts and a second set of reversing prisms arranged coaxially and in series each of the last named reversing prisms being associated to one of the first named reversing prisms, and a gearing interposed between any two associated reversing prisms whereby the rotation of any of the first named reversing prisms through any angle brings about a rotation of the reversing prisms associated thereto through a predetermined fraction of the said angle, a pointer mark at one end of the said set of the said last named reversing prisms and means comprising a gearing for rotating both pointer marks simultaneously the leverage of the last named gearing being the same as the leverage of the gearing interposed between any of the first named reversing prisms and its associated reversing prism of the said set.

KARL PETSCHENIG.